UNITED STATES PATENT OFFICE.

JAMES RAMSEY SPEER, OF PITTSBURG, AND GEORGE H. HARVEY, OF GLENFIELD, PENNSYLVANIA, ASSIGNORS TO BROWNSVILLE GLASS COMPANY, OF PITTSBURG, PENNSYLVANIA, A CORPORATION OF PENNSYLVANIA.

METHOD OF MANUFACTURING GLASS.

No. 828,147.      Specification of Letters Patent.      Patented Aug. 7, 1906.

Application filed April 19, 1906. Serial No. 312,619.

*To all whom it may concern:*

Be it known that we, JAMES RAMSEY SPEER, residing at Pittsburg, and GEORGE H. HARVEY, residing at Glenfield, in the county of Allegheny and State of Pennsylvania, citizens of the United States, have invented or discovered new and useful Improvements in Methods of Manufacturing Glass, of which the following is a specification.

Our invention relates to the method of drawing cylinders from molten or plastic glass, then dividing the same into segments and also, if desired, into sections transversely of the cylinders, and, finally, if preferred, causing the segmental lengths or sections to have plane surfaces.

Our method contemplates the drawing of glass cylinders of much greater diameter than has hitherto been found practicable for the manufacture of window or other similar drawn glass; but we do not desire to be restricted to any minimum diameter of the cylinders when the steps succeeding the drawing operation are substantially those which we practice or are fair equivalents of the same.

In the manufacture of common window-glass by machinery it is the practice at present to draw glass cylinders of from fourteen to twenty inches in diameter, divide the same into shorter lengths, and cut or crack each section from end to end along a single line and while it is subjected to heat in the flattening-oven at the entrance to the leer to open or flatten the same by means of tools. During this opening process the cylinder lies with the cut or cracked line uppermost and the heat in the flattening-oven is such that the cylinder would collapse at each side of the cut or crack and destroy the glass product, unless skilled attendants, called "flatteners," by their tools lift up the glass along the cut or crack and work the edges in opposite directions, so as to cause these edges to gradually come down to the floor of the oven. This process requires a high degree of skill, as the glass is apt to wrinkle or bend longitudinally several times if extreme care is not taken to work the edges over evenly and to smooth or rub what was the inner surface of the cylinder carefully and skilfully with pieces of wood. After considerable time and labor these cylinders finally are pressed down so as to lie fairly flat on the flattening-stone forming the floor of the oven; but this procedure does not make the glass entirely flat, as an examination of ordinary window-glass will show. The common method just described of making glass by machinery does not differ very sensibly from the old method of hand-blowing, the greatest difference being in the length of the cylinders drawn rather than in their diameters.

The flattening of a cylinder of glass by the method just described produces a great strain on the glass. The flattening process produces a stretching of the glass in the inner stratum of the cylinder if we may assume for the present that the cylinder is composed of two concentric cylinders meeting at their adjacent surfaces and a compression of the outer stratum. This tension or stretching and compression is present no matter how slightly the initial curve or arc may be; but it becomes, of course, very great when a half of a cylinder is caused to move away from its integral other half, so as to eliminate an arc therein of one hundred and eighty degrees. Not only must the edges of the glass fall or be drawn down one hundred and eighty degrees, or by a distance equal to the diameter of the cylinder, but the cylinder must at the same time be unfolded, so that its edges move laterally half the circumference of the cylinder.

It is evident that the material in the outer assumed stratum cannot be transferred to the stretching inner stratum by the flattening process, because any attempt to get the glass sufficiently plastic for that purpose would produce a collapse and a folding of the glass in spite of the efforts of the flatteners to the contrary. We therefore saw that no improvement in the product could be reasonably expected by any improvement in the treatment or flattening of a cylinder into a single sheet.

Heretofore it has not proved advantageous to flatten cylinders much exceeding eighteen inches in diameter, because of the increased difficulty in opening the cylinders and bringing them into plane sheets and of the necessarily-increased size of the furnace, which even with small cylinders are necessarily too large to be economic and satisfactorily efficient. We find it practical and economic to draw large cylinders—five or six feet in diameter, for example—and to divide each cylinder into segments, preferably four or more, (though there would still be economy over the old methods if a smaller number of segments were made,) and then preferably to flatten the several segments. The cylinders may before-being made into segments, as described, be divided transversely into cylindrical sections of the desired lengths.

To flatten a sixteen-inch cylinder in the usual way, each edge must travel downward sixteen inches and outward about twenty-five inches to be changed from a semicircle in cross-section to a flat surface. To flatten one of the four equal segments of a cylinder having a diameter of five feet, each edge will travel downwardly less than nine inches and outwardly less than two and a half inches. The glass sheet developed from the said cylinder will be only about three inches wider than that produced from the said segment. The tension on the assumed inner and outer strata of the segment is therefore practically negligible. The segment cannot collapse in the flattening-oven so that one part thereof will fall upon another, as would happen with cylinders if attendants were not employed to prevent the same, nor would they be likely to wrinkle so much. Such segments as we have described would almost automatically flatten themselves. Their flattening would not require as highly skilled labor as in the case of entire cylinders, as but slight skill would be required to press down the edges and rub out the wrinkles, if any.

The larger the cylinders drawn the closer its segments approach a plane and the easier the flattening and the better the product, as the labor and skill required and the tension developed in the assumed strata of the glass would be reduced. The division of the cylinder in segments having short arcs also accomplishes the same results, because after the division of a segment into two segments the bending of the glass proceeds half from each edge instead of all from one edge.

By our process we make a decided saving. Comparing the common method with a sixteen-inch cylinder with ours, wherein, for example, a sixty-inch cylinder is divided into four equal segments, we get approximately four times as much glass in our cylinder at a drawing operation, which will consume no more time than for the smaller cylinder. The product of our cylinder will be superior, as it has not undergone such severe strains, and it will be freer from distortion. It will also for this reason be flattened in a shorter time, and it will not require so high-priced and skilled labor as the integral cylinders require.

After the segments have been flattened they pass into a leer of approved construction.

We do not limit ourselves to any manner of drawing the cylinders or to their diameter or length or to the manner of cracking or dividing the same into segments, or to the relative size of the segments, or to any method of flattening and annealing them. We prefer to make the segments of such a size that there is no danger, even with unskilled attendants, of one part of the segment collapsing on another. We should regard the cutting of a cylinder into two unequal segments as coming within our invention, as the formation and treatment of the smaller segment would be employing the principles thereof. The dividing of the drawn cylinder into two or more cylinders would still be the practice of our claims, as the cylinders referred to therein are not necessarily the whole cylinder made at a drawing operation, but may be the shorter cylinders into which the original cylinder may be divided.

Where it is desired to make sheets of standard sizes, such as are made by opening a cylinder to form a single sheet, the circumference of our large sheet may in order to save waste be made substantially a multiple of the circumference of the cylinders from which said single standard sizes are made. The cylinder will be divided so as to make as many equal segments as the large cylinder is times greater than the smaller one. In cases where the said standard sheet is divided into a number of smaller sheets we may reach the same result by dividing some or all of the segments produced as just described into smaller segments to correspond with the sizes into which the standard sheet may be divided. Of course, the order in which the large and small segments are made is immaterial.

We claim—

1. Producing a glass cylinder, dividing the whole into arc-shaped segments, and then flattening the segments.

2. Producing a glass cylinder, dividing the whole into arc-shaped segments, at least one having in section an arc which, when laid on its convex surface, will have no portion thereof lying over its concave surface, and then flattening and annealing the segment or segments.

3. Producing a glass cylinder, dividing the whole into arc-shaped segments, each having no portion lying over its concave surface, and then flattening and annealing the segments.

4. Producing a glass cylinder whose circumference is a multiple of that of a cylinder required to be opened along a single line to form a sheet of predetermined width, dividing said first cylinder into segments whose arcs are each substantially equal to the circumference of said second cylinder, flattening said segments, and annealing the same.

5. Producing a glass cylinder whose circumference is a multiple of that of a cylinder required to be opened along a single line to form a sheet of predetermined width, dividing said first cylinder into segments whose arcs are each substantially equal to the circumference of said second cylinder, dividing some or all of said segments into smaller segments, flattening said segments, and annealing the same.

Signed at Pittsburg, Pennsylvania, this 17th day of April, 1906.

J. RAMSEY SPEER.
GEORGE H. HARVEY.

Witnesses:
  F. N. BARBER,
  C. E. EGGERS.